United States Patent [19]
Parsons

[11] 3,964,620

[45] June 22, 1976

[54] VEHICLE LOADING APPARATUS AND METHOD

[76] Inventor: Ward H. Parsons, 1202 Green Glen Road, Birmingham, Ala. 35216

[22] Filed: Jan. 13, 1975

[21] Appl. No.: 540,338

[52] U.S. Cl. ............................ 214/41 R; 141/95; 214/152
[51] Int. Cl.² .................................. B65G 67/06
[58] Field of Search .............. 214/41, 42 R, 152; 141/94, 95

[56] References Cited
UNITED STATES PATENTS

| | | | |
|---|---|---|---|
| 3,235,104 | 2/1966 | Morawski et al. | 214/42 R |
| 3,666,119 | 5/1972 | Parsons | 214/41 |

*Primary Examiner*—Robert G. Sheridan
*Attorney, Agent, or Firm*—B. P. Fishburne, Jr.

[57] ABSTRACT

Vehicles to be loaded are advanced to a loading station beneath a material supply source. A first sensing means senses the presence of a vehicle and activates a signal device to alert the driver to stop at the loading position or terminates the operation of automatic means for advancing the vehicle. An overhead second sensing means and an associated flowable solids load level sensor are lowered until the second sensing means detects the top of the vehicle load-receiving body. Flowable solids are released from the overhead source and the discharge of material continues until the load level sensor is displaced by the first load increment reaching a desired level, at which point an output of the load level sensor terminates the release of material from the overhead source and activates signals means whereby the vehicle is advanced sufficiently to cause the load level sensor to return to a normal non-sensing position, at which point a second increment of the load is released from the overhead source unitl the level of the second load increment is sufficient to cause another displacement of the load level sensor. Incremental repositioning of the second sensing means and load level sensor is automaticaly obtained in cases where the load-receiving body of the vehicle is tapered or uneven in height.

19 Claims, 8 Drawing Figures

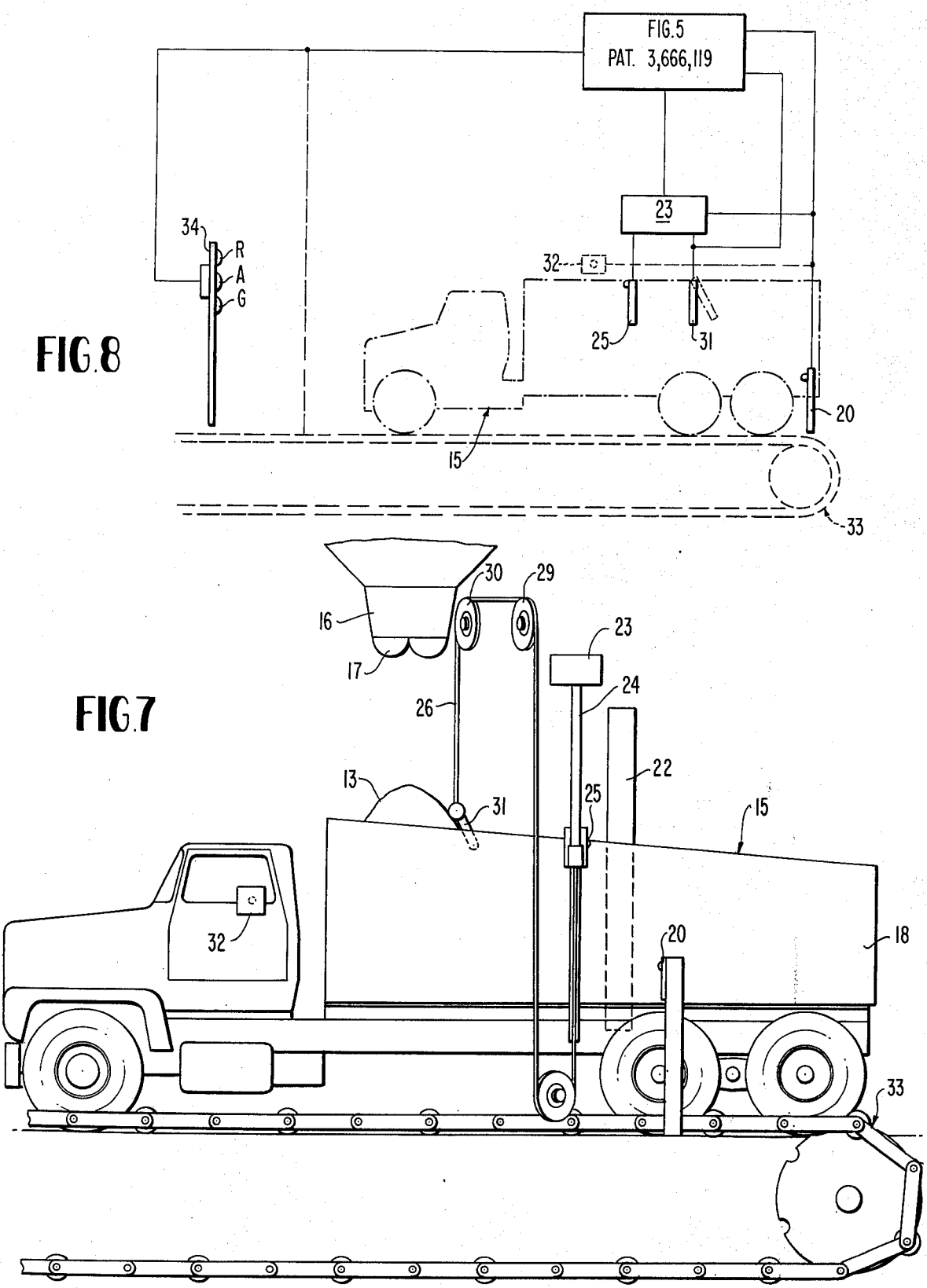

VEHICLE LOADING APPARATUS AND METHOD

BACKGROUND OF THE INVENTION

The loading of trucks and railway cars with flowable solids from overhead supply bins or hoppers has long been an awkward and haphazard procedure involving much spillage of valuable material and the incomplete loading, overloading or uneven loading of the vehicles and rail cars. Such uneven loading and overloading can be particularly dangerous in the case of railway cars in a train and is also dangerous in the case of trucks causing instability and other problems pertaining to safe driving. The premises around the loading station is soon cluttered with overflow or waste solids requiring additional labor and economic loss due to frequent cleaning up operations.

It has long been recognized as desirable to provide some means for the orderly and controlled automatic or semi-automatic loading of vehicles with flowable solids to alleviate the above problems and economic losses, and in the prior art, some proposals have been offered to solve the problem but none has proven to be entirely satisfactory. One example of the patented prior art is disclosed in U.S. Pat. No. 3,666,119, issued May 30, 1972, to Ward H. Parsons. In this patent, a driver-operated truck approaches an overhead loading hopper having release gates for flowable solids. The truck driver manually positions a start-up switch assembly in accordance with a digital setting on a nearby graduated scale to properly position the elevations of a pair of load level sensing probes or tilt switches. Following this, the driver operates the start-up switch in response to which the overhead bin gates open and the loading of the truck takes place at the forward extremity of the load-receiving body. When the load of solids reaches a desirable level, the load level sensor is displaced or tilted to close the bin gates and activate a first signal light which tells the truck driver to advance the vehicle. As soon as the load level sensor returns to its normal vertical position, the signal light is extinguished so that the driver will stop the truck and the bin gates reopen to discharge another increment of the load into the truck body up to the level where the level sensor is again displaced and the driver's advance signal is reactivated. This cycle is repeated in the patent until the loading of the vehicle is completed back to the rear end of the load-receiving body, at which pont the truck tailgate displaces the second sensor or tilt switch, activating a green light telling the driver that the truck is fully loaded and to drive the truck away. The bin gates are held closed at this point.

While the patented arrangement of vehicle loading is a substantial advance in the art, the system is not entirely foolproof and therefore not completely satisfactory in terms of reliability and complete practicality, and therefore there continues to be a need for an even more improved and efficient loading apparatus and method for trucks, rail cars and the like.

It is the objective of the present invention to completely satisfy the requirements of the art for loading vehicles with flowable solids from an overhead source and, in so doing, to utilize to a great extent the load level sensing means, signalling means and automatic bin gate operating means of the prior patent. However, in so doing, the present invention has achieved a simplification of the apparatus in the prior patent by entirely eliminating one probe or tilt switch without any loss of the functional results obtained by two such probes in the patent. Additionally, and more importantly, this invention eliminates reliance on the human operator or driver of the vehicle to preset the load level sensor manually by a digital setting in relation to the known capacity of the vehicle or railway car. This manual operation, either by the driver or bin operator, requires first, an awareness of the digital setting number on the scale, and second, conscientiousness on the part of the driver or operator in the setting of the number so as not to overflow or overfill the vehicle. In many cases, such reliability on the part of human operators is not forthcoming and therefore the present invention eliminates the need for reliance on manual operation for the all-important positioning of the load level sensor or tilt switch probe. In the invention, such positioning takes place automatically without need for a human operator and is entirely in response to the operation of a sensing device which detects the presence of a truck or railway car at the loading station beneath the hopper, and in response to such detection activates a lowering means for an overhead second sensing device associated with the load level sensor, causing these two elements to descend together toward the vehicle load-receiving body.

When the second sensing device detects the top of the load-receiving body, the lowering means is deactivated and the load level sensor is stopped and positioned at the proper level to regulate the depth of loading of the vehicle so that no overloading or spillage of material can occur. From the point on, the mode of operation for completely loading the vehicle with flowable solids in several increments is carried out substantially in accordance with the teachings of U.S. Pat. No. 3,666,119. The disclosure of this patent, therefore, is relied upon as a part of the disclosure in this application and the patent is thus incorporated herein by reference for the sake of simplifying and minimizing the disclosure in this application.

Following the completion of vehicle loading in this invention and the movement of the vehicle beyond the first sensing device which has continued to sense the presence of the vehicle during the complete loading process, the first sensing device now detects the absence of the loaded vehicle and in response to this detection or sensing operation the load level sensor and the second sensing device coordinated with it are both returned automatically to their normal overhead positions well above the vehicle ready for the start of a subsequent loading cycle of operation when the next truck or railway car in a train approaches and is detected by the first sensing device, whereupon the abovedescribed cycle is repeated.

An added advantage of the invention over the prior art lies in the ability of the load level sensor to automatically reposition itself at different levels during the complete loadout of the vehicle in such cases where the load-receiving body of the vehicle is uneven in height or tapers toward the rear as is frequently the case with large trailer bodies. In such cases, the second sensing device associated with the load level sensor will continuously respond to the changes in silhouette of the vehicle body and continuously reactivate the raising and lowering means for the load level sensor and the second sensing device, whereby these elements are properly repositioned during advancement of the truck or vehicle to the several incremental loading positions.

Additionally, the present invention lends itself to a completely automated system in which trucks may be driven onto an automatic conveyor similar to conveyors found in automatic car washing facilities. In the invention, such a conveyor will advance the vehicle to the initial sensing position whereupon the automatic positioning of the load level sensor will take place exactly as previously described, as well as the incremental loading of the truck under regulation of the load level sensor. However, there will be no necessity for a driver to advance the vehicle during the incremental loading, responsive to a signal light or to an audible signal. Instead, the truck conveyor means will be periodically activated and deactivated to advance the truck properly for the several incremental loadings thereof in response to the operation of the load level sensor.

It is the intention in this invention not to be limited to the use of any particular form of sensing or detecting instrumentalities, or any particular form of raising and lowering means for the load level sensor. Various forms of these devices may be used. Also, the overhead source of flowable solids may be a bin or hopper with gates or may be a power-driven material conveyor of any practical type. Therefore, the particular apparatus to be described in detail is illustrative only of one practical embodiment of the invention and it should be understood that the details of apparatus may be varied and the essential method may be practiced with various forms of the apparatus shown schematically in the accompanying drawings.

Other features and advantages of the invention will become apparent during the course of the following detailed description.

DESCRIPTION OF DRAWING FIGURES

FIG. 7 is a view similar to FIG. 4 showing a modification of the invention wherein the vehicle is automatically advanced by a conveyor means.

FIG. 8 is a block diagram of control circuitry employed in the invention.

DETAILED DESCRIPTION OF PREFERRED EMBODIMENTS

Figure 1:
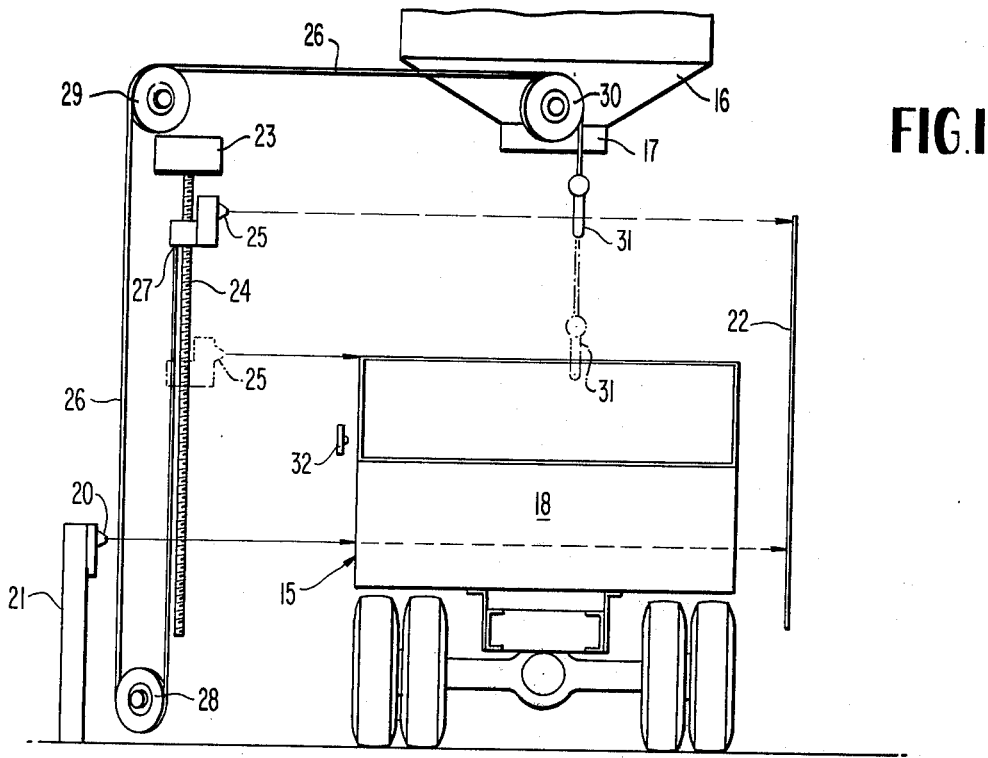
FIG. 1 is a partly schematic elevational view of a vehicle loading apparatus as viewed from the rear end of a vehicle at the loading station.

Referring to the drawings in detail wherein like numerals designate like parts, the numeral 15 designates a driveroperated truck in FIGS. 1 through 6 to be loaded in accordance with the invention with flowable solids from an elevated bin or hopper 16 having remotely controlled discharge gate means 17 which are opened and closed at proper times in accordance with the teachings of U.S. Pat. No. 3,666,119. As shown in the drawings, the truck 15 has a load-receiving body 18 which is elongated and which tapers in profile from front-to-rear, the body having a downwardly and rearwardly sloping top edge 19. The invention will operate satisfactorily with other forms of load bodies including those which are not tapered or those which have an irregular profile and in this respect the invention is extremely versatile in its ability to automatically load a variety of types of vehicles without overloading or underloading or spillage of material.

The automatic loading apparatus comprises a first conventional relay light beam source and photoconductive unit 20 which may also be termed a first sensing means of the invention, or an electro-optical sensing means. Such devices are very well known and are commercially available and therefore need not be described in great detail herein. The first sensing means 20 is supported by a post 21 near and slightly in advance of the loading station below the hopper gate 17, with the first sensing means at a proper elevation to sense or detect the presence or absence of the truck load body 18, as it enters the loading station, travels gradually therethrough and finally leaves the loading station in a properly loaded condition. Preferably, a coacting vertically elongated light reflective strip 22 is fixedly supported in opposed relationship to the light beam unit 20 near the opposite side of the loading lane through which the vehicle 15 enters and leaves the loading station. This strip functions to reflect light from the unit 20 back onto the photocell or equivalent photoconductive means thereof in order to operate relay contacts, not shown, of the unit 20 in accordance with an overall mode of operation to be described. In some instances, the reflective strip 22 may not be necessary and may be dispensed with in the invention, where electro-optical sensors of a type which may reflect light directly from the load body 18 back onto the unit are employed. Such devices are known in the art.

A fixed elevated motorized mechanical drive unit 23 is suitably mounted near the elevation of the hopper gate 17 and slightly upstream therefrom on the same side of the vehicle lane as the sensing unit 20. This motorized drive unit 23 may employ a depending vertical drive screw 24 or equivalent driving means for a second verticaly vertically electro-optical sensing means 25 substantially identical to the first sensing means 20 and drivingly coupled to the screw 24 to be raised and lowered by the operation of this screw. The light reflective strip 22 coacts with the electro-optical unit 25 in the same manner described for the first unit 20 during the operation of the system.

A cable 26 or the like has one end attached as at 27 to the electro-optical sensing unit 25 and extends downwardly and is trained under a lower pulley 28 suitably mounted near the elevation of the sensing unit 20 and a substantial distance below the drive unit 23. The same cable 26 extends upwardly to an elevation near the drive unit 23 and is then trained over a fixed elevated pulley 29 from which the cable extends horizontally toward the hopper 16 and is trained over a third pulley 30 preferably mounted thereon or, if preferred, on some adjacent support. It should be understood that the arrangement of the parts now being described is diagrammatically shown in the drawings for ease of illustration and understanding and in this respect the drawings are not mechanically consistent in all details and are not intended to be more than a schematic representation of parts.

A load level sensor 31, in the form of a tilt switch means, is attached to the end of cable 26 remote from the sensing unit 25 and hangs freely on the cable below the pulley 30 and immediately adjacent to the hopper gate 17 or very slightly in advance thereof, see FIG. 2. The arrangement is such that responsive to operation of the mechanical drive unit 23, the second electro-optical sensing unit 25 and the load level sensor 31 are raised and lowered in unison and through the same distances relative to the vehicle load-receiving body 18. The purpose of this arrangement will be fully described.

Figure 4:
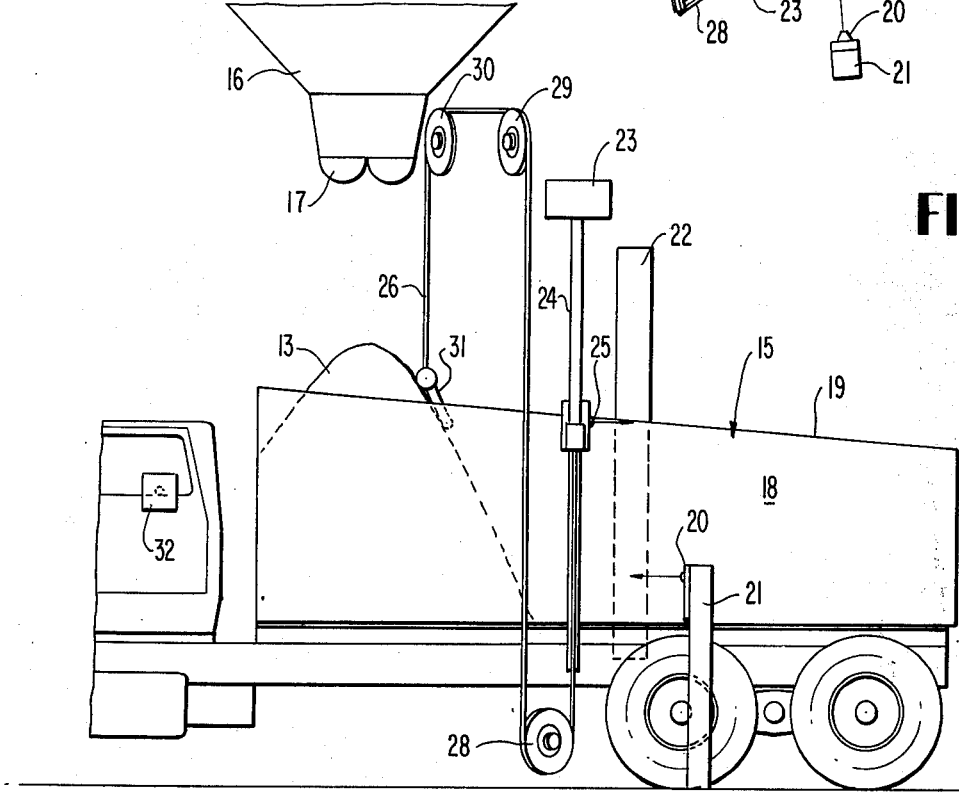
FIG. 4 is a side elevational view of the apparatus and vehicle in the relative positions shown in FIG. 3.
Figure 5:
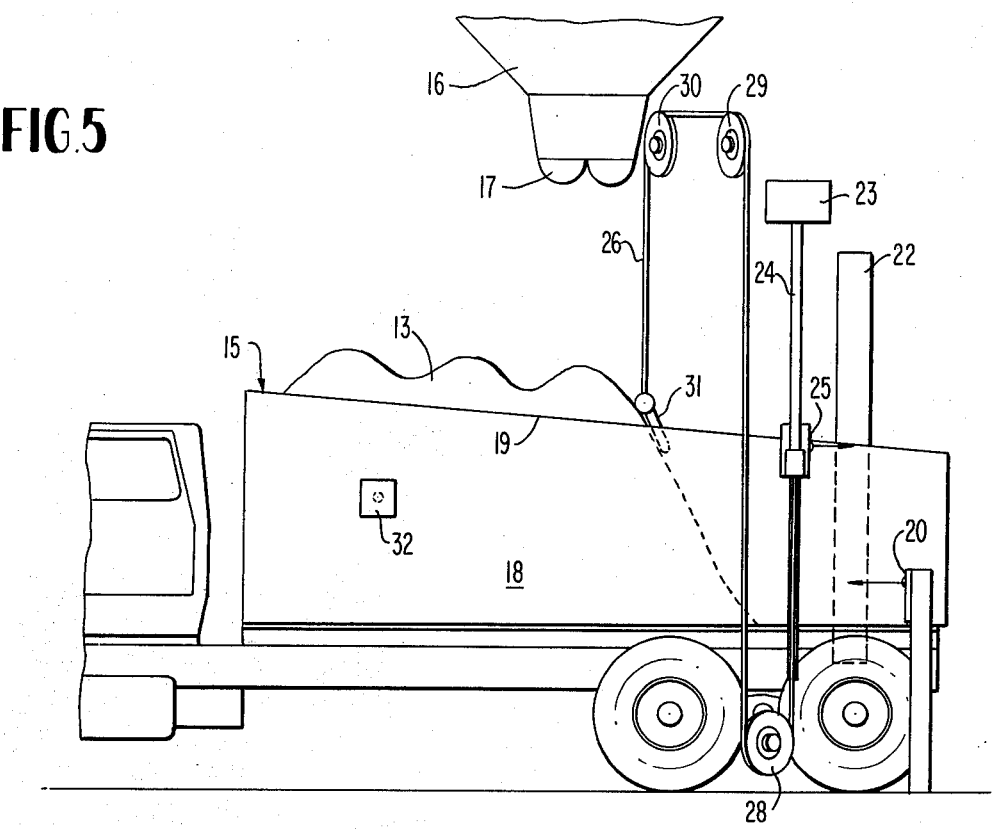
FIG. 5 is a side elevational view similar to FIG. 4 but with the vehicle advanced to a position where it has already received several incremental loads of flowable solids.

For use in an alternate mode of operation, the apparatus preferably includes a momentary push button switch 32 in ready reach of the truck driver at the loading station, FIG. 4, and this start-up switch, when activated, will energize a holding relay as disclosed in U.S. Pat. No. 3,666,119 through the contacts of the relay electro-optical sensing means 20. The circuitry involved in the entire system except for that shown in FIG. 5 of the abovementioned patent is purely conventional and need not be dealt with in detail for a proper understanding of the invention.

By means of the above-described apparatus or equivalent apparatus components, a very unique method of loading vehicles is obtained as follows, with continued reference to FIGS. 1 through 6.

Figure 2:
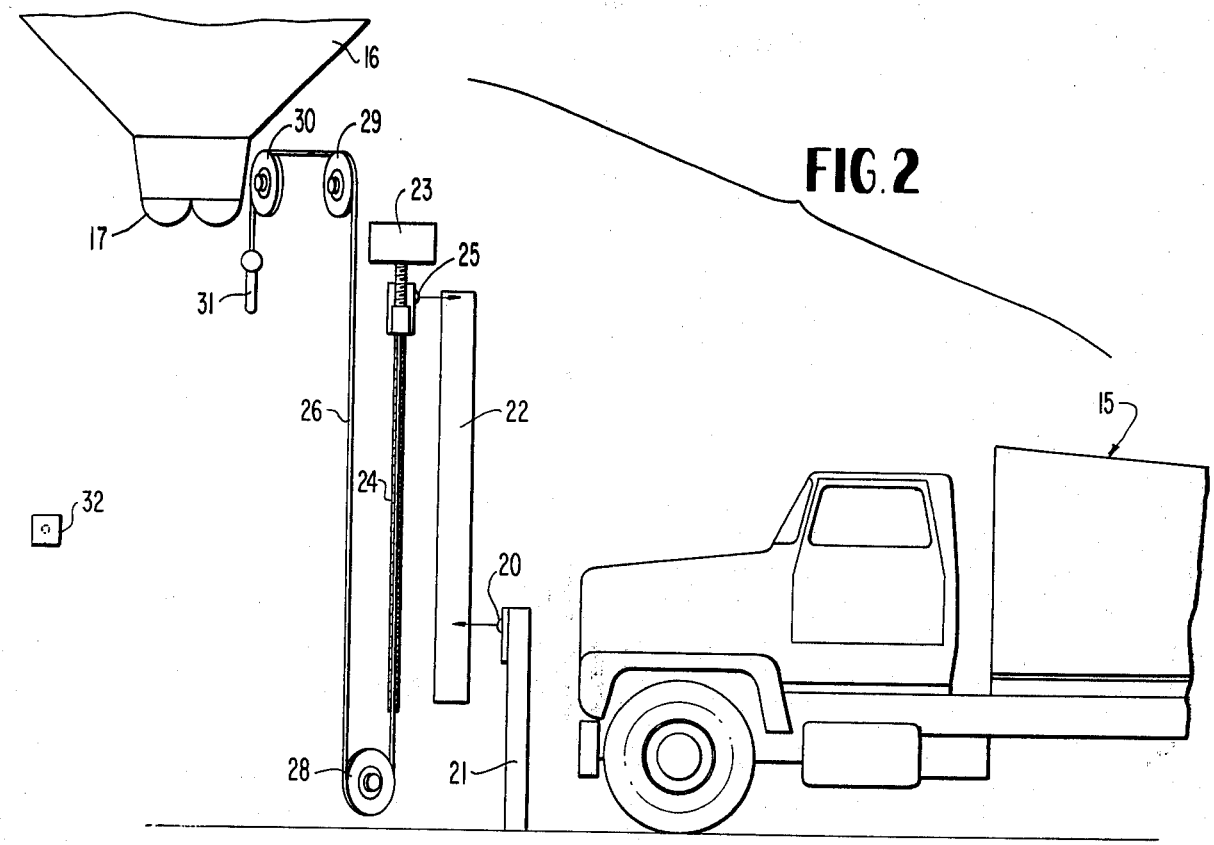
FIG. 2 is a partly schematic side elevation of the apparatus and the vehicle with the latter approaching the material loading station.
Figure 3:
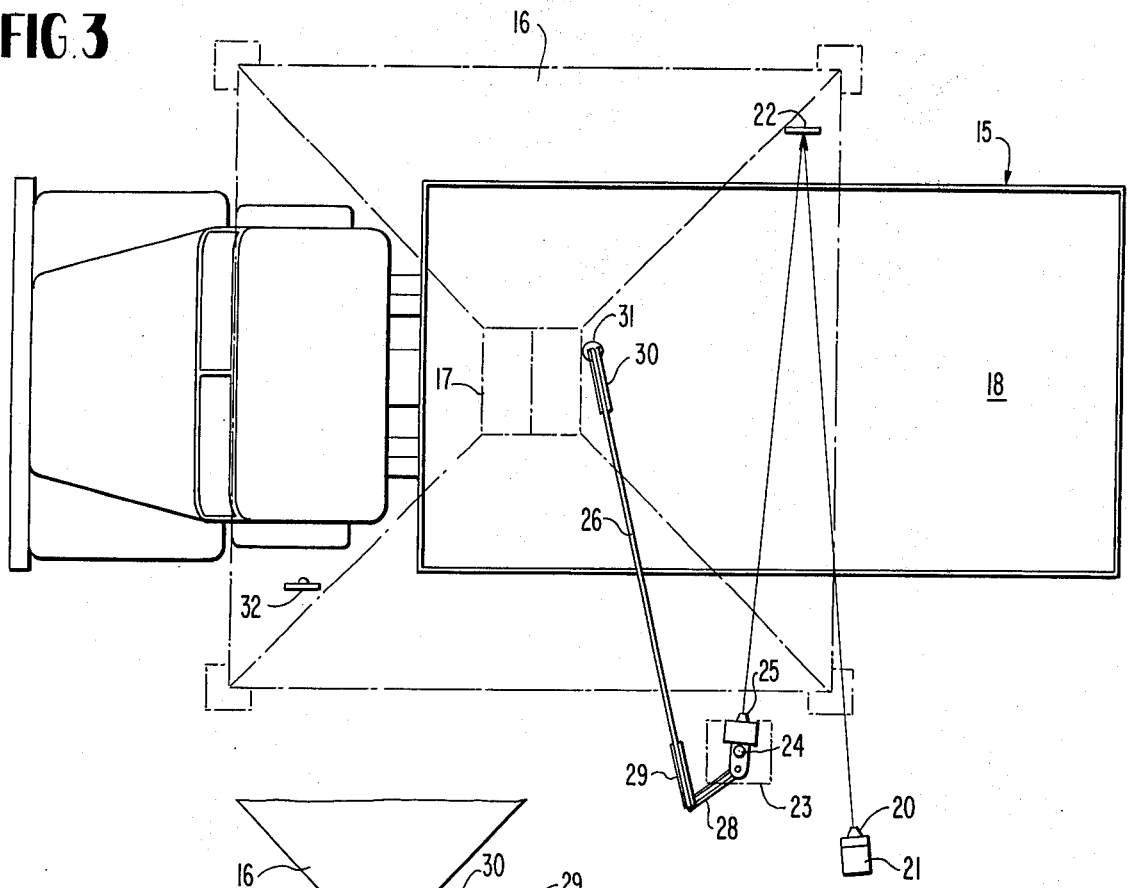
FIG. 3 is a partly schematic plan view of the apparatus and vehicle at the loading station, with the vehicle positioned to receive a first increment of the load from the overhead source.

As in FIG. 2, the truck 15 to be loaded is driven toward the loading station depicted in FIG. 4 but has not yet reached the point where it would interrupt the light beam 9a emanating from the first sensing unit 20 and reflecting back onto the photoconducting means of that unit from strip 22. At this point, the motorized drive unit 23 is inactive following completion of the preceding cycle of operation and the second sensing unit 25 and coordinated load level sensor 31 are both locked in the overhead position above the level of the truck 15. The approach of the truck continues until the light beam 9a is interrupted by the truck. When this occurs, a relay in the sensing unit 20 will cause activation of the electric motor driven mechanical unit 23, causing the screw shaft 24 to turn, and causing simultaneous lowering of the second sensing unit 25 and the load level sensor 31. This may be identical tilt switch sensor or probe described in U.S. Pat. No. 3,114,804, referred to in U.S. Pat. No. 3,666,119.

The elements 25 and 31 will continue their descent until the beam of light 3a emanating from sensing unit 25 is interrupted by the upper edge of truck body 18 as graphically depicted in FIG. 1. When this occurs, a relay in the second sensing unit 25 dictates the stopping of the mechanical drive unit 23 with the load level sensor 31 now positioned at precisely the correct elevation to regulate the level of flowable solids 13 in the truck body at the first incremental loading without spillage or overflowing, as depicted in FIG. 4. It should also be mentioned that the driver of the truck will stop the vehicle at the proper point to receive the first increment of the load, responsive to a red light signal, not shown, activated by interruption of the light beam 9a from sensing unit 20 following short time delay interval to allow the cab of the truck to pass beyond the hopper gate 17 as shown in FIG. 4. If preferred, the initial stopping of the truck for first incremental loading may be accomplished by direct vision of the driver.

In any case, following interruption of the beam 3a and the stopping of downward movement of the elements 25 and 31, the hopper gate 17 will be open in response to an electrical output of the second sensing unit 25 by the same mode of operation described in U.S. Pat. No. 3,666,119 following operation of start switch 45 in that patent.

At this point, the complete loading of the truck body 18 will take place according to the operation described in Patent 3,666,119 with the components 25 and 31 remaining at a fixed elevation, provided that the upper edge 19 of the vehicle body is level. However, in the case of a tapered truck body where the upper edge 19 is sloping, the elements 25 and 31 will automatically reposition themselves at a slightly lower level following each small advance movement of the truck by the driver in response to the signal light means disclosed in said prior patent. At each such forward movement of the truck, the light beam 3a will again impinge on the reflective strip 22 because of the gradually decreasing height of the top edge 19. Each time this happens, the mechanical drive unit 23 will be reactivated and will drive the two elements 25 and 31 downwardly a further slight distance, until the top of the truck body again interrupts the beam 3a and stops the drive unit 23, thus positioning the load level sensor 31 at a new and slightly lower elevation to compensate for the gradually decreasing depth of the body 18 toward its rear end. This in turn assures the proper incremental loading of the truck body according to the mode of operation in the mentioned prior patent without overfilling or underfilling and with full compensation for the lessening depth of the truck body. Thus, the level of the load in the vehicle is properly regulated automatically without driver assistance except for the following of the signal means, such as green and amber lights, as explained in said prior patent.

Figure 6:
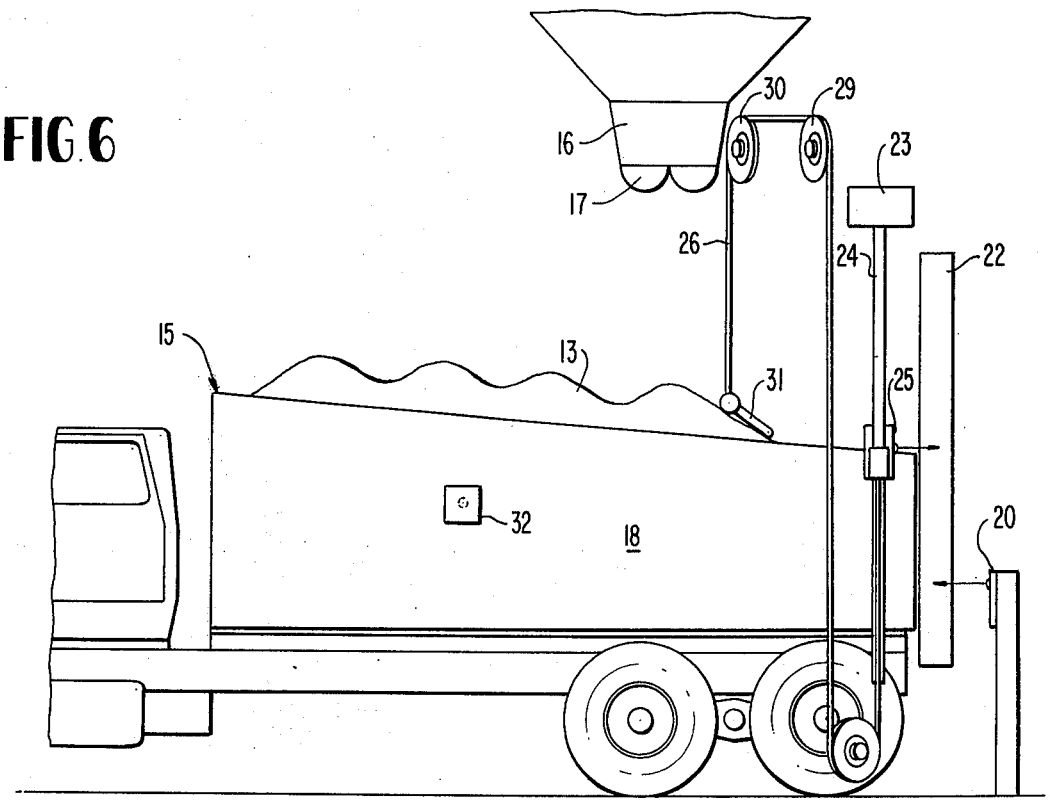
FIG. 6 is a view similar to FIGS. 4 and 5 showing the vehicle at the completion of loading immediately prior to the raising or returning of the vertically movable load level sensor and associated electro-optical sensor to their overhead positions.

The loading of the truck 15 continues incrementally toward the rear of the body 18 according to the operation in U.S. Pat. No. 3,666,119 but under the coordinated control of the second electro-optical sensing device 25 and the load level sensor 31 as graphically shown in FIG. 5, and until the truck is fully loaded to the proper level, which condition is shown in FIG. 6. At this time, the rear end of truck body 18 has passed beyond light beam 9a from first sensing device 20 and the beam can again be reflected by the strip 22 back onto the photoconductive means of the sensing unit 20. When this happens and while the truck is still stopped in the final loading position, responsive to the relay means of the sensing unit 20, the mechanical drive unit 23 will be activated in a reverse direction to completely raise the elements 25 and 30 back to their overhead positions originally described in FIG. 2 where they will remain held until another vehicle approaches the loading station beneath the hopper 16 and again interrupts the light beam 9a of first sensing unit 20, whereupon the described loading cycle will be repeated.

It should be appreciated that the apparatus and the described method may be utilized for the automatic loading of a series of trucks of the same type or of trucks whose sizes in terms of length and height of load body are different. In the latter instance, the system responds automatically in the described manner to reposition the load level sensor 31 as required for even loading. In this manner, a train of cars, such as coal cars, of equal heights or varying heights can be accommodated by the invention.

It will now be understood that the invention as thus far described represents a substantial advance in the art over U.S. Pat. No. 3,666,119 because the vehicle driver is relieved of the necessity for manually setting the critical height of the load level sensor by a digital setting, as described in the prior patent. All that the driver need do in the present invention is respond to the dictates of signal lights with reasonable promptness, and his attention can be strictly directed to the signal lights as there are no other operations requiring driver participation.

In order to render the system entirely independent of driver or operator control, the arrangement shown in FIG. 7 may be employed as a modification of the invention. In this case, the truck 15 or other vehicle to be loaded is advanced into and through the loading station without driver control by a motorized conveyor 33 which may be similar to the type of conveyor employed in an automatic car washing facility in that the truck driver drives the vehicle onto the conveyor and from that point the automatic conveyor advances the vehicle without driver control. Except for this added conveyor feature, the apparatus and method are exactly as previously described in FIGS. 1 through 6. In lieu of the type of conveyor mechanism depicted in FIGS. 7 and 8, various other conveyor means independent of driver control could be employed, including various winch arrangements, hydraulically or air-operated push rod conveyors, cable and dog mechanisms, and the like.

FIG. 8 shows a block diagram of the entire system with and without the conveyor feature 33. The system as shown in FIGS. 1 to 6 is represented by full lines in FIG. 8 and the system of FIG. 7 adds the conveyor means 33 as indicated in dotted lines. When this latter feature is employed, the signal light means 34 indicated in FIG. 8 could be omitted or simply disabled in the system.

FIG. 8 also shows in dotted lines the described momentary switch 32 which may be employed as an alternate means for starting up the mechanical drive unit 23 through the relay of the first electro-optical sensing means 20.

The mode of operation of the described apparatus in the practice of the method of loading vehicles may be summarized as follows.

A vehicle 15 under driver control, FIGS. 2 and 4, or under conveyor control, FIG. 7, approaches the loading station beneath the loading hopper 16, and in so doing interrupts the light beam 9a from first sensing unit 20. Responsive to this, the driver in the case of a driver-operated vehicle will be signalled to stop by a red light or equivalent means. Substantially simultaneously, an output from the device 20 will activate the mechanical drive means 23 and begin the simultaneous lowering of the second electro-optical sensing means 25 and the load level sensor 31. The elevated and lowered positions of these elements are depicted in the drawing figures.

When the second sensing unit 25 senses the top edge 19 of the truck body, the descent of the unit 25 and the coordinated load level sensor 31 will stop and substantially simultaneously the hopper gate 17 will open to discharge the first load increment into the front of the body 18. This loading of flowable solids will continue until the level of the load engages and tilts the load level sensor 31 which embodies a tilt switch. When this occurs, the gate 17 will be closed automatically and the signal light means 34 will be operated automatically as described in prior U.S. Pat. No. 3,666,119 whose circuitry in FIG. 5 of that patent is embodied in this invention, as indicated in FIG. 8.

The complete loading of the truck body 18 will take place as described in said prior patent with the elements 25 and 31 remaining in a fixed lowered position for a truck having a non-tapered body, with a level upper edge. If the upper edge 19 is inclined or irregular, the elements 25 and 31 will automatically be repositioned as the vehicle is moved forwardly for several incremental loadings by a driver or by the conveyor means 33.

Finally, when the truck loading is complete, FIG. 6, and the body 18 has passed beyond the sensing means 20, the light beam 9a will again be reflected from the strip 22 and the elements 25 and 31 will be raised and the loaded truck 15 may now move on properly loaded under driver control, as previously described.

It is to be understood that the forms of the invention herewith shown and described are to be taken as preferred examples of the same, and that various changes in the shape, size and arrangement of parts may be resorted to, without departing from the spirit of the invention or scope of the subjoined claims.

I claim:

1. A method for loading vehicles with flowable solids comprising the steps of advancing a vehicle to a loading station, detecting the advancement of the vehicle with a first sensing means and utilizing an output of the first sensing means to initiate lowering of a second sensing means and a coordinated load level sensor while the vehicle is stopped, detecting the top edge of the vehicle to be loaded by operation of the second sensing means and thereby stopping the descent of the second sensing means and said load level sensor with the load level sensor positioned at the proper elevation to regulate the load level in the vehicle, substantially simultaneously delivering flowable solids into the load receiving body of the vehicle in a first loading position of the vehicle, sensing the desired level of said flowable solids in the vehicle with said load level sensor and thereby terminating the delivery of said solids, advancing the vehicle to a second loading position and thereby allowing said load level sensor to return to its previous non-sensing position thereby again effecting delivery of said flowable solids into the vehicle at the second loading position, repeating the incremental loading of the vehicle at additional loading positions until the vehicle is fully loaded to a proper level and advancing the vehicle from the last loading position beyond the first sensing means whereby the operation of the latter causes the returning of the second sensing means and said load level sensor to their original elevated positions.

2. The method of claim 1, and additionally detecting variations in the profile of the top edge of the vehicle during incremental forward movements thereof with the second sensing means to thereby effect an automatic repositioning of the second sensing means and said load level sensor at new elevations along the vehicle to assure proper control of the load level by operation of the load level sensor.

3. The method of claim 1, and additionally utilizing an output of the load level sensor to activate signal means to enable a driver of a vehicle to advance and stop the vehicle at proper times during incremental loading thereof.

4. The method of claim 1, wherein the advancement of the vehicle during the method is by operation of a vehicle conveyor means coordinated with the operation of said first sensing means and said load level sensor.

5. The method of claim 1, wherein said delivering of flowable solids comprises delivering the solids from an overhead source above the vehicle and controlling such delivery by operation of the load level sensor.

6. The method of claim 1, wherein said first and second named detecting steps are performed by first and second electro-optical sensing means.

7. A method for loading open top vehicles in succession with flowable solids from an overhead source of such solids comprising advancing each vehicle to a loading station below said overhead source and in so doing detecting the presence of the vehicle at the loading station, stopping the vehicle, and lowering a vehicle load level sensor, detecting the top edge of the vehicle body while lowering said sensor and thereby stopping said lowering with the sensor positioned properly relative to the vehicle to regulate the load level therein, delivering flowable solids from said overhead source into the top of the stopped vehicle and continuing the delivery until the level of solids in the vehicle displaces the load level sensor, and then terminating said delivery, and advancing the vehicle sufficiently to allow the load level sensor to return to a non-sensing position separated from the solids in the vehicle, and again delivering said solids from said overhead source until the load level sensor is again displaced.

8. The method of claim 7, and repeating the advancement of the vehicle followed by delivery of solids thereto until the vehicle is filled uniformly throughout its length, and detecting the passage of the vehicle beyond the loading station and responsive to such detecting, elevating the load level sensor to a normal overhead stored position above the tops of vehicles being loaded and holding the load level sensor in such position until the next vehicle advancing to said loading station has its presence detected.

9. The method of claim 8, and additionally detecting variations in the height of the top edge of each vehicle body during an incremental loading sequence and responsive to this detection repositioning the load level sensor at an adjusted level relative to the vehicle body to assure the proper loading thereof.

10. Apparatus for loading vehicles with flowable solids comprising a supply source of said solids at a vehicle loading station, a first detector means adjacent the loading station to detect the presence of a vehicle entering the loading station, a second detector means and a coordinated vehicle load level sensor, means to lower and to raise the second detector means and said load level sensor in unison responsive to the operation of the first detector means, and means responding to the operation of the second detector means when the latter detects the top of a vehicle body to be loaded at the loading station to terminate the lowering of the second detector means with the load level sensor with the sensor at a proper elevation to regulate the level of flowable solids in said vehicle body and to initiate delivery of flowable solids from said supply source to said vehicle body.

11. The apparatus of claim 10, wherein said last-named means includes a delivery outlet means on said supply source, and an additional means to open and close said delivery outlet means.

12. The apparatus of claim 11, wherein said supply source of solids comprises an overhead hopper containing flowable solids and said delivery outlet means comprises a movable discharge gate at the bottom of said hopper.

13. The apparatus of claim 10, wherein said first and second detector means are a pair of electro-optical detector units.

14. The apparatus of claim 13, and a stationary light reflective element common to both electro-optical detector units and adapted to reflect a light beam from each detector unit back onto a photosensitive element of each unit.

15. The apparatus of claim 10, and said means to lower and to raise the second detector means and said load level sensor comprising a motorized mechanical drive means having a driving connection with said second detector means and said load level sensor.

16. The apparatus of claim 15, wherein said driving connection comprises a rotary gear drive between said mechanical drive means and said second detector means and a flexible element drive between the second detector means and the load level sensor whereby the latter are raised and lowered in unison and for the same distances.

17. The apparatus of claim 10, wherein said load level sensor comprises a tilt switch probe adapted for engagement with the flowable solids being delivered into the vehicle body.

18. The apparatus of claim 10, and a coordinated conveyor means for vehicles entering the loading station and moving each vehicle into position for detection by the first detector means and subsequently advancing the vehicle responsive to operations of the load level sensor to incremental loading positions without driver control.

19. The apparatus of claim 10, and vehicle driver signal means activated by operation of the load level sensor at each incremental loading position of the vehicle to regulate the advancement and stopping of the vehicle during its incremental loading.

* * * * *